United States Patent
Yan et al.

(10) Patent No.: US 10,912,332 B2
(45) Date of Patent: Feb. 9, 2021

(54) ELECTRONIC CIGARETTE AND CONTROL METHOD THEREOF

(71) Applicant: Shenzhen First Union Technology Co., Ltd., Shenzhen (CN)

(72) Inventors: Huiyong Yan, Shenzhen (CN); Yonghai Li, Shenzhen (CN); Zhongli Xu, Shenzhen (CN)

(73) Assignee: Shenzhen First Union Technology Co., Ltd., Guangdong (CN)

( * ) Notice: Subject to any disclaimer, the term of this patent is extended or adjusted under 35 U.S.C. 154(b) by 342 days.

(21) Appl. No.: 16/010,505

(22) Filed: Jun. 17, 2018

(65) Prior Publication Data

US 2018/0360117 A1 Dec. 20, 2018

(30) Foreign Application Priority Data

Jun. 19, 2017 (CN) .......................... 2017 1 0463621

(51) Int. Cl.
 *A24F 40/50* (2020.01)
 *A24F 47/00* (2020.01)
 *G05B 19/416* (2006.01)

(52) U.S. Cl.
 CPC .............. *A24F 40/50* (2020.01); *A24F 47/00* (2013.01); *A24F 47/008* (2013.01); *G05B 19/416* (2013.01); *G05B 2219/37399* (2013.01)

(58) Field of Classification Search
 CPC ................................ A24F 47/008; A24F 40/50
 See application file for complete search history.

(56) References Cited

U.S. PATENT DOCUMENTS

| 5,649,554 | A | * | 7/1997 | Sprinkel | ............... | A24F 47/008 128/202.21 |
| 8,714,150 | B2 | | 5/2014 | Alelov | | |
| 2018/0140020 | A1 | * | 5/2018 | Zhao | ..................... | A24F 47/008 |
| 2018/0360117 | A1 | * | 12/2018 | Yan | ......................... | A24F 47/00 |
| 2019/0387794 | A1 | * | 12/2019 | Yan | ..................... | H01M 10/488 |

FOREIGN PATENT DOCUMENTS

| WO | 20150089711 A1 | 6/2015 |
| WO | 20150107552 A1 | 7/2015 |
| WO | 20150131991 A1 | 9/2015 |

* cited by examiner

*Primary Examiner* — James Harvey
(74) *Attorney, Agent, or Firm* — Proi Intellectual Property US; Klaus Michael Schmid

(57) ABSTRACT

An electronic cigarette and a control method thereof are disclosed. The electronic cigarette defines an airflow channel and has a heating assembly. The control method includes: sensing a pressure or pressure difference in the airflow channel to generate a corresponding electrical signal; generating a corresponding control signal according to the electrical signal; and generating a corresponding output power according to the control signal and outputting the power to the heating assembly. The electronic cigarette and control method thereof obtain the inhalation force of a user by sensing the pressure or pressure difference in the airflow channel and then adjust the output power automatically. The user experience is improved.

8 Claims, 2 Drawing Sheets

ELECTRONIC CIGARETTE AND CONTROL METHOD THEREOF

TECHNICAL FIELD

The present disclosure relates to the technical field of electronic cigarettes, and particularly, to an electronic cigarette and a control method thereof.

BACKGROUND

At present, most electronic cigarettes record puffs and durations of smoking through the number of times and durations their buttons are pressed. However, this kind of method may not accurately reflect the actual puffs and durations of smoking. The error is relatively big.

Most of current electronic cigarettes trigger working through the press of their buttons. These electronic cigarettes still have power consumption even if no user smokes. The battery drains quickly.

At present, most high-power electronic cigarettes are set to fixed output powers through buttons. The use is inconvenient. Users generally smoke through mouth inhalation and lung inhalation. The mouth inhalation and the lung inhalation generate different inhalation forces and different airflow strengths. If the electronic cigarettes may not output different powers and aerosols according to different smoking situations, the electronic cigarettes may not well meet the mouth inhalation and the lung inhalation simultaneously. As a result, the user experience is poor.

SUMMARY

The present disclosure provides an electronic cigarette and a control method thereof, so as to solve the problem in the prior art that the user experience is poor because electronic cigarettes are set to fixed output powers.

In order to solve the above technical problem, the present disclosure employs the following technical scheme: A control method for an electronic cigarette is provided, the electronic cigarette defining an airflow channel inside and having a heating assembly. The method includes the following steps:

sensing a pressure or pressure difference in the airflow channel to generate a corresponding electrical signal;

generating a corresponding control signal according to the electrical signal; and generating a corresponding output power according to the control signal and outputting the power to the heating assembly.

According to one embodiment of the present disclosure, before sensing the pressure or pressure difference in the airflow channel to generate the corresponding electrical signal, the method further includes: judging whether airflow strength reaches a threshold, and switching on a working circuit of the electronic cigarette when the airflow strength reaches the threshold.

According to one embodiment of the present disclosure, after switching on the working circuit, the method further includes: selecting an alternative smoking mode.

According to one embodiment of the present disclosure, after switching on the working circuit, the method further includes: adding a new smoking mode.

According to one embodiment of the present disclosure, while sensing the pressure or pressure difference to generate the corresponding electrical signal, the method further includes: recording the number of times and durations the electrical signal is generated.

In order to solve the above technical problem, the present disclosure employs another technical scheme as follows. An electronic cigarette is provided, which defines an airflow channel and has a heating assembly. The electronic cigarette includes the following:

a pressure or pressure difference sensor, which is configured for sensing a pressure or pressure difference in the airflow channel to generate a corresponding electrical signal;

a master control circuit, which is electrically connected to the pressure or pressure difference sensor and is configured for generating a corresponding control signal according to the electrical signal; and a power output circuit, which is electrically connected to the master control circuit and is configured for generating a corresponding output power according to the control signal and outputting the power to the heating assembly.

According to one embodiment of the present disclosure, the electronic cigarette further includes a start switch, the start switch is a push-button switch, and the push-button switch is electrically connected to the master control circuit and is configured for switching on or switching off a working circuit constructed by the pressure or pressure difference sensor, the master control circuit, the power output circuit and the heating assembly; or the start switch is the pressure or pressure difference sensor itself, and the pressure or pressure difference sensor judges whether airflow strength reaches a threshold and switches on the working circuit when the airflow strength reaches the threshold.

According to one embodiment of the present disclosure, the electronic cigarettes further includes a setting button, and the setting button is electrically connected to the master control circuit and is configured for selecting an alternative smoking mode or adding a new smoking mode.

According to one embodiment of the present disclosure, the push-button switch and the setting button are the same button, the switch on or switch off function is realized by long pressing the button, and the selecting an alternative smoking mode or adding a new smoking mode is realized by short pressing the button.

According to one embodiment of the present disclosure, the electronic cigarette further includes a battery and a battery charge and discharge management circuit; and the battery and the battery charge and discharge management circuit are electrically connected to the master control circuit.

The present disclosure has the following beneficial effects. Different from the prior art, the electronic cigarette and control method thereof provided by the present disclosure learn the inhalation force of a user by sensing the pressure or pressure difference in the airflow channel and then adjust the output power automatically. The user experience is improved.

BRIEF DESCRIPTION OF THE DRAWINGS

For a better understanding of the technical scheme in the embodiments of the present disclosure, accompanying drawings needed in the description of the embodiments are simply illustrated below. Obviously, the accompanying drawings described below are some embodiments of the present disclosure. For the ordinary skill in the field, other accompanying drawings may be obtained according to these accompanying drawings without creative work.

DETAILED DESCRIPTION

A clear and complete description as below is provided for the technical scheme in the embodiments of the present disclosure in conjunction with the drawings in the embodiments of the present disclosure. Obviously, the embodiments described hereinafter are simply part embodiments of the present disclosure, rather than all the embodiments. All other embodiments obtained by the ordinary skill in the art based on the embodiments in the present disclosure without creative work are intended to be included in the scope of protection of the present disclosure.

Figure 1:
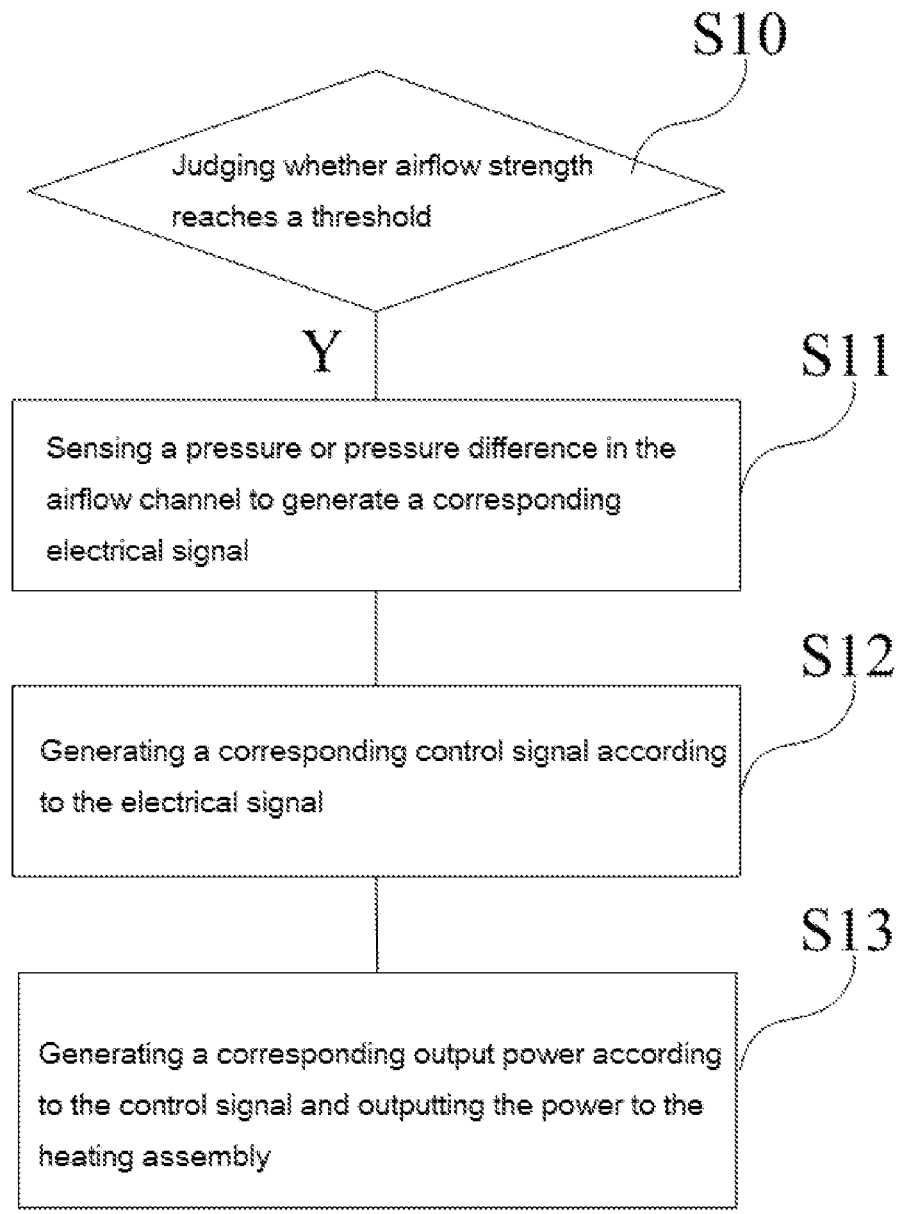
FIG. 1 is a simplified flowchart of a control method for an electronic cigarette according to one embodiment of the present disclosure.

Referring to FIG. 1, the present disclosure provides a control method for an electronic cigarette, the electronic cigarette defining an airflow channel and having a heating assembly. The method includes the following steps:

S10: judging whether airflow strength reaches a threshold, and switching on a working circuit of the electronic cigarette when the airflow strength reaches the threshold.

In S10, when the airflow strength does not reach the threshold, the next action will not be performed. At this time, it may be that the electronic cigarette is shaken and the airflow strength slightly changes. Generally, the airflow strength reaches the threshold significantly only when a user smokes. When the airflow strength reaches the threshold, the next action will be performed. It should be noted that S10 may also be that a user directly switches on the working circuit through a push-button switch on the electronic cigarette.

S11: sensing a pressure or pressure difference in the airflow channel to generate a corresponding electrical signal.

In S11, the pressure or pressure difference may be sensed by a pressure or pressure difference sensor disposed in the airflow channel. The pressure or pressure difference in the airflow channel generally changes dynamically. Therefore, the corresponding electrical signal changes dynamically. The size of the pressure or pressure difference is directly proportional to the size of the electrical signal.

S12: generating a corresponding control signal according to the electrical signal.

In S12, since the electrical signal changes with the dynamic change of the pressure or pressure difference, the corresponding control signal changes dynamically too.

S13: generating a corresponding output power according to the control signal and outputting the power to the heating assembly.

In S13, the heating assembly may be a heating wire. Similarly, the output power changes with the dynamic change of the control signal.

Through the above modes, when the inhalation force is bigger, the power of the heating assembly is higher and the corresponding aerosol is heavier, and, when the inhalation force is smaller, the power of the heating assembly is lower and the corresponding aerosol is lighter. Generally, during the smoking process, the change of the inhalation force presents parabolic curve. Through the above modes of the present disclosure, the power output to the heating wire changes presenting parabolic curve synchronously too. The smoking is very close to the true cigarette smoking experience.

In one embodiment of the present disclosure, after switching on the working circuit, the method further includes: selecting an alternative smoking mode. The alternative smoking mode, for example, may include a light aerosol mode and a heavy aerosol mode. When the light aerosol mode is selected, the power output to the heating assembly is relatively low. When the heavy aerosol mode is selected, the power output to the heating assembly is relatively high. In this way, diversified requirements of users may be satisfied.

In one embodiment of the present disclosure, after switching on the working circuit, the method further includes: adding a new smoking mode. A user may set a mode suiting his/her taste according to the smoking feeling. Specifically, the user may set and store a new smoking mode by increasing or reducing the power output to the heating assembly.

In one embodiment of the present disclosure, while generating the corresponding electrical signal according to the pressure or pressure difference, the method further includes: recording the number of times and durations the pressure or pressure difference is generated. In a smoking state, even if a user keeps the push-button switch enabled and the electronic cigarette keeps working, the period of time when the user does not inhale is not counted into the duration the pressure or pressure difference is generated. Therefore, the amount of nicotine ingested by the user may be accurately calculated and the user may adjust the smoking habit according to the amount of nicotine ingested.

Figure 2:
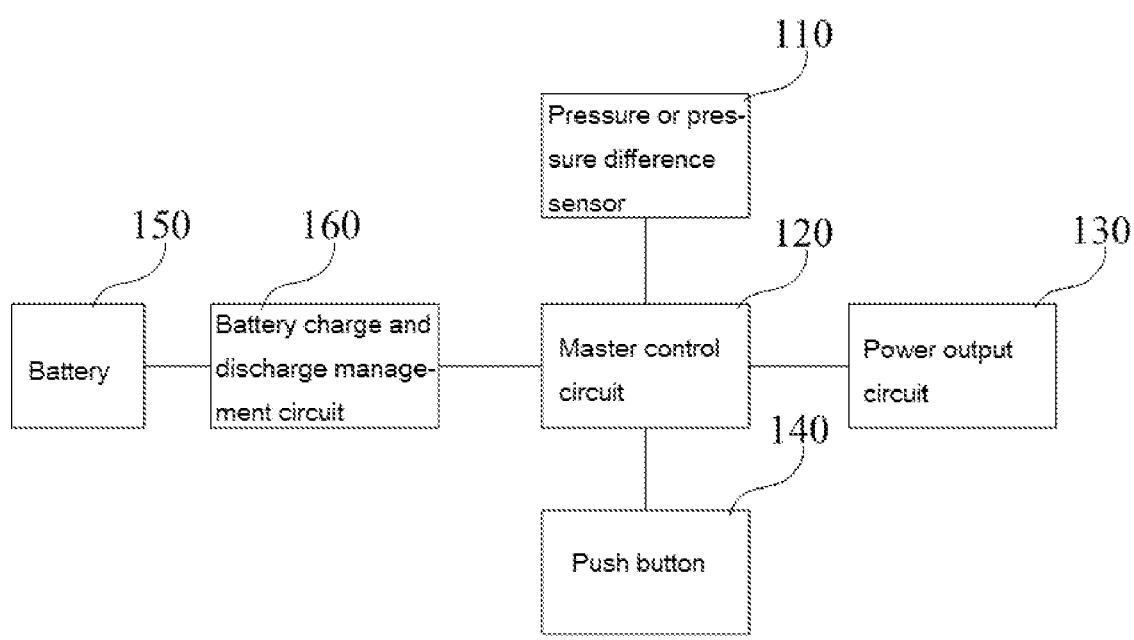
FIG. 2 is a simplified modular structure diagram of an electronic cigarette according to one embodiment of the present disclosure.

Referring to FIG. 2, the present disclosure further provides an electronic cigarette, which defines an airflow channel and has a heating assembly. The electronic cigarette includes a pressure or pressure difference sensor 110, a master control circuit 120, a power output circuit 130, etc.

Herein, the pressure or pressure difference sensor 110 may be disposed in the airflow channel and is configured for sensing a pressure or pressure difference in the airflow channel to generate a corresponding electrical signal; the master control circuit 120 is electrically connected to the pressure or pressure difference sensor 110 and is configured for generating a corresponding control signal according to the electrical signal; the size of the pressure or pressure different is directly proportional to the size of the electrical signal; the master control circuit 120 is further responsible for charge and discharge control, power control, push-button detection, detection of output power of the sensor, etc. The power output circuit 130 is electrically connected to the master control circuit 120 and is configured for generating a corresponding output power according to the control signal and outputting the power to the heating assembly. The heating assembly may be a heating wire. The power output circuit 130 may include a power conversion circuit and a power output control circuit.

In one embodiment of the present disclosure, the electronic cigarette further includes a start switch, and the start switch may be a push-button switch, for example, the push button 140 shown in FIG. 2. The push button 140 is electrically connected to the master control circuit 120 and is configured for switching on or switching off a working circuit constructed by the pressure or pressure difference sensor 110, the master control circuit 120, the power output circuit 130 and the heating assembly. The start switch of the working circuit may also be the pressure or pressure difference sensor 110 itself, and the pressure or pressure difference sensor 110 judges whether airflow strength reaches a threshold and switches on the working circuit when the airflow strength reaches the threshold.

The electronic cigarette further includes a setting button, and the setting button is electrically connected to the master control circuit 120 and is configured for selecting an alternative smoking mode or adding a new smoking mode.

The alternative smoking mode, for example, may include a light aerosol mode and a heavy aerosol mode. When the light aerosol mode is selected, the power output to the heating assembly is relatively low. When the heavy aerosol mode is selected, the power output to the heating assembly is relatively high. In this way, diversified requirements of users may be satisfied. In the adding a new smoking mode, a user may set a mode suiting his/her taste according to the smoking feeling. Specifically, the user may set and store a new smoking mode by increasing or reducing the power output to the heating assembly.

In one embodiment of the present disclosure, the push-button switch and the setting button may be two separate buttons; or the push-button switch and the setting button may be the same button, the switch on or switch off function is realized by long pressing the button, and the selecting an alternative smoking mode or adding a new smoking mode is realized by short pressing the button.

The electronic cigarette further includes a battery 150 and a battery charge and discharge management circuit 160. The battery 150 may be a lithium battery, and the battery charge and discharge management circuit 160 is electrically connected to the master control circuit 120.

Herein, the battery charge and discharge management circuit 160 is configured for performing the charge and discharge management of the battery 150.

To sum up, those skilled in the art are easy to understand that the electronic cigarette and control method thereof provided by the present disclosure learn the inhalation force of a user by sensing the pressure or pressure difference in the airflow channel and then adjust the output power automatically. The user experience is improved. Meanwhile, the present disclosure may meet the mouth inhalation and the lung inhalation well. Since the power output is triggered through the action of inhalation, compared with the mode of triggering the power output through a button, the present disclosure may save electrical energy, prolong the battery life, and improve the utilization rate of the battery.

The above are embodiments of the present disclosure merely and are not intended to limit the patent scope of the present disclosure. Any equivalent structures or equivalent process transformation made according to the description and the accompanying drawings of the present disclosure, or any equivalent structures or equivalent flow modifications applied in other relevant technical fields directly or indirectly are intended to be included in the patent protection scope of the present disclosure.

What is claimed is:

1. A control method for an electronic cigarette, the electronic cigarette defining an airflow channel inside and having a heating assembly, the method comprising steps of:
    sensing a pressure or pressure difference in the airflow channel to generate a corresponding electrical signal;
    generating a corresponding control signal according to the electrical signal; and
    generating a corresponding output power according to the control signal and outputting the output power to the heating assembly;
    wherein before sensing the pressure or pressure difference in the airflow channel to generate the corresponding electrical signal, the method further comprises a step of: judging whether airflow strength reaches a threshold, and switching on a working circuit of the electronic cigarette when the airflow strength reaches the threshold.

2. The control method according to claim 1, wherein after switching on the working circuit, the method further comprises a step of selecting an alternative smoking mode.

3. The control method according to claim 2, wherein after switching on the working circuit, the control method further comprises a step of adding a new smoking mode.

4. The control method according to claim 1, wherein the step of sensing the pressure or pressure difference to generate the corresponding electrical signal further comprises recording the number of times and durations of the pressure or pressure difference, respectively.

5. An electronic cigarette, which defines an airflow channel inside and has a heating assembly, wherein the electronic cigarette comprises:
    a pressure or pressure difference sensor configured for sensing a pressure or pressure difference in the airflow channel to generate a corresponding electrical signal;
    a master control circuit electrically connected to the pressure or pressure difference sensor and configured for generating a corresponding control signal according to the electrical signal; and
    a power output circuit, electrically connected to the master control circuit and configured for generating a corresponding output power according to the control signal and outputting the power to the heating assembly;
    wherein the electronic cigarette further comprises a start switch, wherein the start switch is a push-button switch, and the push-button switch is electrically connected to the master control circuit and is configured for switching on or switching off a working circuit constructed by the pressure or pressure difference sensor, the master control circuit, the power output circuit and the heating assembly; or
    the start switch is the pressure or pressure difference sensor itself, and the pressure or pressure difference sensor judges whether airflow strength reaches a threshold and switches on the working circuit when the airflow strength reaches the threshold.

6. The electronic cigarette according to claim 5, further comprising a setting button, wherein the setting button is electrically connected to the master control circuit and is configured for selecting an alternative smoking mode or adding a new smoking mode.

7. The electronic cigarette according to claim 6, wherein the push-button switch and the setting button are the same button, the switch on/off function is realized by long pressing the button, and the selecting an alternative smoking mode or adding a new smoking mode is realized by short pressing the button.

8. The electronic cigarette according to claim 5, further comprising a battery and a battery charge and discharge management circuit, wherein the battery and the battery charge and discharge management circuit are electrically connected to the master control circuit.

* * * * *